United States Patent Office.

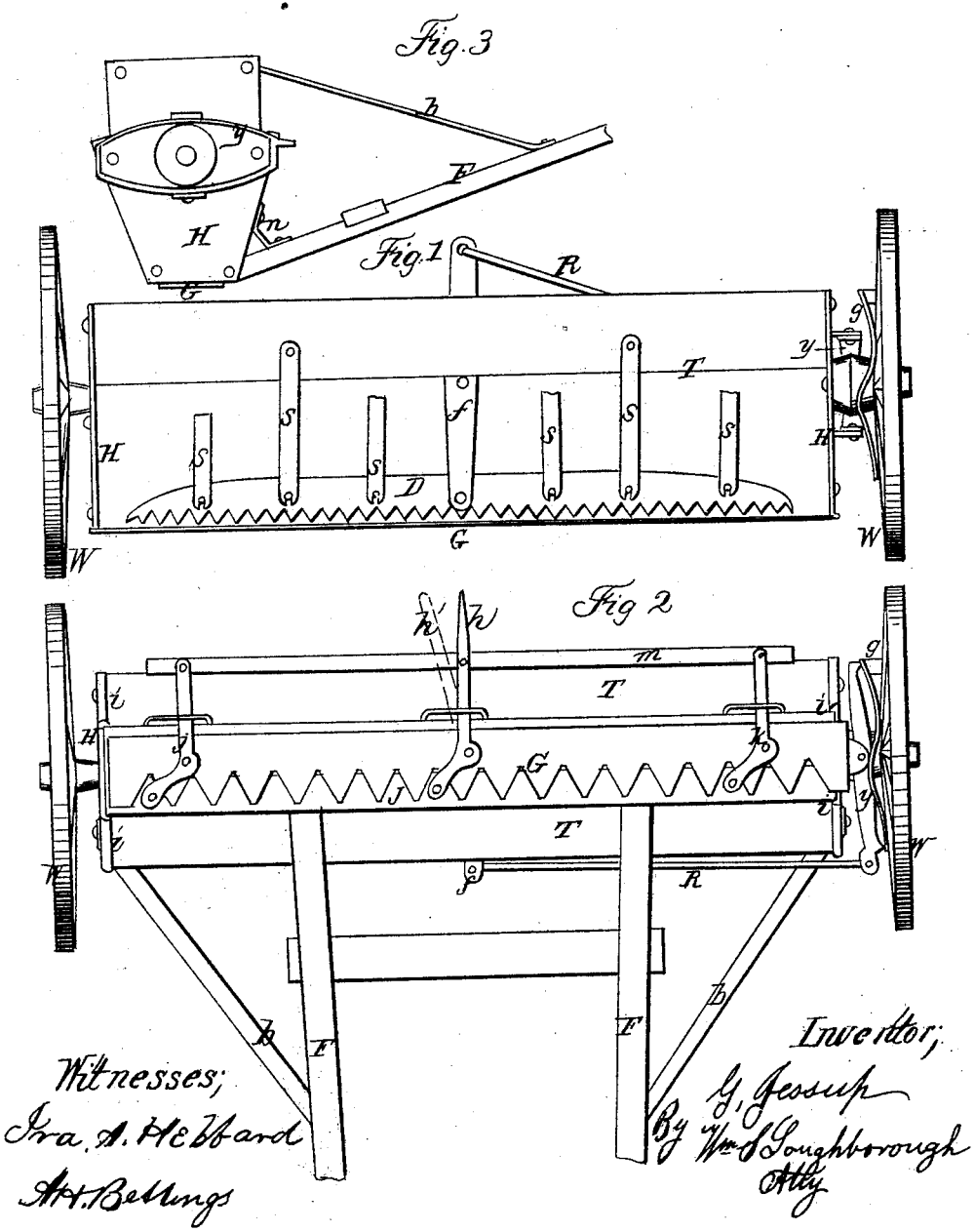

GILBERT JESSUP, OF SHORTSVILLE, NEW YORK.

Letters Patent No. 65,390, dated June 4, 1867.

---

PLASTER-SOWER.

---

The Schedule referred to in these Letters Patent and making part of the same.

---

TO ALL WHOM IT MAY CONCERN:

Be it known that I, GILBERT JESSUP, of Shortsville, in the county of Ontario, and State of New York, have invented certain new and useful "Improvements in Plaster-Sowers;" and I do hereby declare that the following is a full, clear, and exact description thereof, reference being had to the accompanying drawings, making part of this specification, in which—

Figure 1 is a vertical section taken in the direction of the red line $x$, fig. 2, looking towards the front.

Figure 2 is an inverted view of the machine.

Figure 3 is an elevation of the right-hand end, the wheel and the zigzag $g$ being removed.

Like letters indicate corresponding parts.

This invention consists mainly in the manner of suspending the hopper or supply trough to the carrier-wheels. Its nature will be better understood by reference to the drawings and specification.

To enable others to make and use my invention, I will describe its construction and operation.

I make the hopper or trough T with the sides partially or wholly bevelled, as shown in fig. 3. The ends or heads H are made of cast iron with a flange, $i$, fig. 2, projecting from the inner face to receive and support the end of the side boards forming the hopper. The axial arms for the carrier-wheels W are cast upon the heads or end plates H. By suspending the trough T between the wheels, the load is carried upon them instead of being borne partially by the horse, as in the machines heretofore made. Besides, the ordinary framework employed in this class of machines is entirely avoided in the construction of my machine, there being no framework used except the thills and a cross-bar. The thills F may be attached to the hopper by the angle-irons $n$ and the braces $b$, fig. 3. I employ the ordinary zigzag $g$, and double arm pivoted yoke $y$, to drive the distributers or delivery devices with which they are connected by the connecting-rod R, and pivoted lever $f$, fig. 1. The stirrers or agitators $s$ are pivoted, each, alternately to the front and to the rear side of the hopper. The lower ends of the stirrers are forked, and they all connect to the delivery or feeder-bar D by suitable button-headed pivots. The bar D may be made in sections so constructed as to be coupled together by a joint made in the casting, there being a stud on one end and a loop on the other. The lower edge of this bar is serrated, as shown in fig. 1. It is hung so that the teeth just rest upon the adjustable gauge plate G. This latter is also serrated on one edge, making V-shaped openings in the bottom of the hopper. The capacity of these openings may be increased by moving the bent hand-lever $h$ toward the position of the dotted lines $h'$, fig. 2, and vice versa, the openings being more or less covered by the fixed plate J. The serrations in this bar should be about twice as large as those in the distributer plate. This bar or plate G may also be made in sections and connected together similar to the plate D. The sections are supported and adjusted by the bent levers $h$, $j$, and $k$, which are connected by a rod or bar, $m$. It will be seen that by suspending the hopper between the wheels, it may be balanced to ride entirely upon the wheels, and besides, a large carrier-wheel may be used, which is very desirable on such machines, and at the same time the bottom of the box or hopper T may be brought very near the ground, thereby preventing the wind from acting upon the fertilizer which is being sown or deposited. The upper ends of the slats or stirrers $s$, which are pivoted to the rear side of the hopper, are represented as being broken away.

What I claim as my invention, and desire to secure by Letters Patent, is—

1. Effecting a parallel adjustment of the delivery or discharge plate G, by means of the bent or anchor-levers $h$, $j$, and $k$, as set forth.

2. Hanging the hopper T down between the carrier-wheels, whereby it is balanced or nearly so upon the said wheels, substantially in the manner and for the purposes herein shown and described.

3. In combination with the vibrating feed-bar D, having a serrated edge, the agitators $s$, when their lower ends are connected loosely to the said bar D, and the upper end of each alternate one is pivoted to the front side of the box T, and the others to the rear, as shown, and for the purposes specified.

GILBERT JESSUP.

Witnesses:
WM. S. LOUGHBOROUGH,
A. H. BILLINGS.